(12) United States Patent
Pierre et al.

(10) Patent No.: US 6,703,448 B2
(45) Date of Patent: Mar. 9, 2004

(54) BLOCK COPOLYMERS FOR RUBBER COMPOSITIONS USABLE TO TIRES

(75) Inventors: Robert Pierre, Perignat-les-Sarlieve (FR); Jean-Michel Favrot, Cournon-D'auvergne (FR); Jean-Luc Cabioch, Chateaugay (FR); Bernard Voullemier, Aubiere (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 2 days.

(21) Appl. No.: 10/033,279

(22) Filed: Dec. 21, 2001

(65) Prior Publication Data

US 2002/0179218 A1 Dec. 5, 2002

Related U.S. Application Data

(63) Continuation of application No. PCT/EP01/04572, filed on Apr. 23, 2001.

(30) Foreign Application Priority Data

Apr. 25, 2000 (FR) .............................. 00 05345

(51) Int. Cl.⁷ ..................... C08F 297/00; C08F 255/08
(52) U.S. Cl. ..................... 525/314; 525/315
(58) Field of Search ................. 525/314, 315

(56) References Cited

U.S. PATENT DOCUMENTS

| | | | |
|---|---|---|---|
| 3,244,664 A | 4/1966 | Zelinski et al. | |
| 3,842,111 A | 10/1974 | Meyer-Simon et al. | |
| 3,873,489 A | 3/1975 | Thurn et al. | |
| 3,978,103 A | 8/1976 | Meyer-Simon et al. | |
| 3,997,581 A | 12/1976 | Pletka et al. | |
| 4,002,594 A | 1/1977 | Fetterman | |
| 4,072,701 A | 2/1978 | Pletka et al. | |
| 4,129,585 A | 12/1978 | Buder et al. | |
| 4,550,142 A | 10/1985 | Akita et al. | |
| 4,848,511 A | 7/1989 | Ohyama et al. | |
| 5,066,721 A | 11/1991 | Hamada et al. | |
| 5,070,148 A | 12/1991 | Hsu et al. | |
| 5,149,895 A | 9/1992 | Coolbaugh et al. | |
| 5,210,359 A | 5/1993 | Coolbaugh et al. | |
| 5,227,425 A | 7/1993 | Rauline | |
| 5,288,937 A | 2/1994 | Coolbaugh et al. | |
| 5,387,730 A | 2/1995 | Coolbaugh et al. | |
| 5,457,161 A | * 10/1995 | Coolbaugh et al. ......... | 525/271 |
| 5,545,783 A | 8/1996 | Coolbaugh et al. | |
| 5,580,919 A | 12/1996 | Agostini et al. | |
| 5,583,245 A | 12/1996 | Parker et al. | |
| 5,625,100 A | 4/1997 | Coolbaugh et al. | |
| 5,633,415 A | 5/1997 | Brandes et al. | |
| 5,637,783 A | 6/1997 | Brandes et al. | |
| 5,650,457 A | 7/1997 | Scholl et al. | |
| 5,663,358 A | 9/1997 | Cohen et al. | |
| 5,663,395 A | 9/1997 | Göbel et al. | |
| 5,663,396 A | 9/1997 | Musleve et al. | |
| 5,674,932 A | 10/1997 | Agostini et al. | |
| 5,684,171 A | 11/1997 | Wideman et al. | |
| 5,684,172 A | 11/1997 | Wideman et al. | |
| 5,696,197 A | 12/1997 | Smith et al. | |
| 5,708,053 A | 1/1998 | Jalics et al. | |
| 5,765,014 A | 6/1998 | Seki | |
| 5,773,524 A | 6/1998 | Coolbaugh et al. | |
| 5,780,540 A | 7/1998 | Brandes et al. | |
| 5,852,099 A | 12/1998 | Vanel | |
| 5,892,085 A | 4/1999 | Munzenberg et al. | |
| 6,013,718 A | 1/2000 | Cabioch et al. | |
| 6,043,321 A | 3/2000 | Halasa et al. | |
| 6,162,768 A | 12/2000 | Coolbaugh et al. | |
| 6,228,817 B1 | 5/2001 | Coolbaugh et al. | |
| 6,248,702 B1 | 6/2001 | Coolbaugh et al. | |

FOREIGN PATENT DOCUMENTS

| | | |
|---|---|---|
| EP | 0438967 | 7/1991 |
| EP | 0441485 | 8/1991 |
| EP | 0501227 | 9/1992 |
| EP | 0709235 | 5/1996 |
| EP | 0735088 | 10/1996 |
| EP | 1043357 | 10/2000 |
| FR | 2526030 | 11/1983 |
| FR | 2740778 | 5/1997 |
| WO | 9637547 | 11/1996 |

OTHER PUBLICATIONS

D. J. Zanzig, F. L. Magnus, W. L. Hsu, A. F. Halasa, M. E. Testa, Rubber Chemistry and Technology vol. 66, pp. 538–549 (1993).

R. E. Cohen, A. R. Ramos, Macromolecules vol. 12, issue 1, 131–134 (1979).

Brunauer, Emmett and Teller described in "The Journal of the American Chemical Society", vol. 60, p. 309, Feb. 1938.

* cited by examiner

Primary Examiner—James J. Seidleck
Assistant Examiner—Olga Asinovsky
(74) Attorney, Agent, or Firm—Baker Botts L.L.P.

(57) ABSTRACT

The present invention relates to block copolymers intended to constitute an elastomeric matrix of a cross-linkable rubber composition with reduced hysteresis, to such a rubber composition which is usable in the cross-linked state in a tire tread, to such a tire tread and to a tire comprising said tire tread which exhibits reduced rolling resistance. A copolymer with n blocks (n=2 or 3) according to the invention, each of said blocks comprising a diene elastomer having a molar content of units originating from conjugated dienes of greater than 15%, and one or each of said blocks which forms the chain end of said copolymer consisting of a polyisoprene, when n=2 or n=3 respectively, is such that the number-average molecular weight $M_{n1}$ of said or each polyisoprene end block is between about 2,500 and 20,000 g/mol, and such that the number-average molecular weight $M_{n2}$ of the block of said copolymer which is other than said or each polyisoprene end block is between about 80,000 g/mol and 350,000 g/mol.

23 Claims, 1 Drawing Sheet

Fig. 1:

BLOCK COPOLYMERS FOR RUBBER COMPOSITIONS USABLE TO TIRES

CROSS REFERENCE TO RELATED APPLICATION(S)

This application is a continuation of PCT/EP01/04572, filed Apr. 23, 2001.

BACKGROUND OF THE INVENTION

The present invention relates to block copolymers intended to constitute an elastomeric matrix of a cross-linkable rubber composition with reduced hysteresis, to such a rubber composition which is used in the cross-linked state in a tire tread, to such a tire tread and to a tire comprising said tire tread which exhibits reduced rolling resistance.

The tire industry is constantly endeavoring to reduce the hysteresis of mixtures in order to limit fuel consumption and thus conserve the environment.

This reduction in hysteresis must be achieved while maintaining or even improving the processability of the mixtures. Numerous approaches for reducing hysteresis have already been investigated. Chain end functionalization has attracted particular attention.

Most of the suggested methods have involved seeking out adjacent functions on completion of polymerization which are capable of interacting with carbon black, for example contained in star polymers or tin-coupled polymers. European Patent Specification EP-A-709 235 may be mentioned by way of example. Other functions which interact with carbon black have also been attached to chain ends, such as 4,4'-bis(diethylaminobenzophenone), which is also known as DEAB, or other amine functions. Patent specifications FR-A-2 526 030 and U.S. Pat. No. 4,848,511 may be mentioned by way of example.

Some years ago, it became possible to use silica and research has been under way to find functions capable of interacting with this filler. Patent specification FR-A-2 740 778, which discloses for example functions comprising a silanol group, may be in particular be mentioned in this connection. Mention may also be made of specification U.S. Pat. No. 5,066,721, which discloses alkoxysilane or aryloxysilane functions, or also specification U.S. Pat. No. 3,244,664.

Most of these approaches, whether for carbon black or for silica, bring about a genuine reduction in hysteresis and an increased level of reinforcement in the corresponding compositions. Unfortunately, it is also generally the case that these improvements result in greater difficulty in processing these compositions.

Other means of reducing hysteresis which do not affect processing of the mixtures have thus been sought.

In particular, using polymers with a low hysteresis potential, in particular polyisoprene, has appeared to be a promising approach. However, directly using this type of polymer does not always provide a satisfactory compromise between dynamic modulus and hysteresis.

In order to overcome this disadvantage, the attempt has been made to use block copolymers comprising a polyisoprene block.

Block copolymers are generally composed of materials in segregated phases. Diblock polyisoprene/polystyrene copolymers, the synthesis of which has been comprehensively described in the literature, may be mentioned by way of example. These diblock copolymers are known to exhibit valuable impact resistance properties.

Block copolymers comprising polyisoprene and polybutadiene blocks (respectively abbreviated to IR and BR) have also been described in the literature.

Certain post-polymerization reactions convert these elastomers into thermoplastic materials. For example, when hydrogenating a triblock BR/IR/BR copolymer, the butadiene fraction forms a crystalline polyethylene, while the isoprene fraction gives rise to a rubbery ethylene/butylene type material.

Hydrochlorination of these materials may also impart crystalline properties thereto.

Diblock IR/SBR copolymers (polyisoprene/copolymer of styrene and butadiene) have been described in European Patent Specification EP-A-438 967 in relation to a reinforcing filler specifically comprising carbon black. The molecular weight of the IR block is preferably between 70,000 and 150,000 g/mol, while that of the SBR block is preferably between 220,000 and 240,000 g/mol. Furthermore, the ratio of the molecular weight of the IR block to that of the SBR block must be greater than 33% and may be as much as 300%.

The rubber compositions described in this document may be of a variable structure, which is lamellar when said ratio is of the order of 33%, and spherical when said ratio is of the order of 300%.

However, for all these values of said ratio ranging from 33% to 300%, it should be noted that the relatively high molecular weight of the IR block always results in marked segregation of the phases corresponding to the IR and SBR blocks respectively due to the high content of 1,4-linkages in the IR block.

IR/BR block copolymers have also been considered as compatibilizing agents for blends of polyisoprene and polybutadiene.

The paper by D. J. Zanzig, F. L. Magnus, W. L. Hsu, A. F. Halasa, M. E. Testa, Rubber Chemistry and Technology vol. 66, pp. 538–549 (1993), which mentions the use of IR/BR block copolymers containing 80% or 50% IR, may be mentioned in this connection. At these relative contents, the molecular weight of the IR block is always greater than or equal to 200,000 g/mol and, as a result, blocks of these copolymers also form segregated phases.

Mention may also be made in this connection of the paper by R. E. Cohen, A. R. Ramos, Macromolecules Vol. 12, issue 1, 131–134 (1979). In this paper, the diblock copolymers used comprise IR blocks of a molecular weight of 104,000 g/mol or of 133,000 g/mol. The relatively high weight of the IR blocks and BR blocks also gives rise to severe segregation of the phases associated with these two blocks.

SUMMARY OF THE INVENTION

The present invention relates to a copolymer with n blocks (n=2 or 3) intended to constitute an elastomeric matrix of a cross-linkable rubber composition with reduced hysteresis, each of said blocks comprising an "essentially unsaturated" diene elastomer (i.e. having a molar content of units originating from conjugated dienes of greater than 15%), and one or each of said blocks which forms the chain end of said copolymer comprising a polyisoprene, when n=2 or n=3 respectively, which is such that the number-average molecular weight $M_{n1}$ of said or each polyisoprene end block is between about 2,500 and 20,000 g/mol, and such that the number-average molecular weight $M_{n2}$ of the block of said copolymer which is other than said or each polyisoprene end block is between about 80,000 g/mol and 350,000 g/mol, permits significant optimization of the results for hysteresis reduction and processability for said rubber composition.

The subject of the invention also relates to cross-linkable or cross-linked rubber compositions comprising an elastomeric matrix containing the block copolymer according to the invention.

The subject of the invention is also tires and, in particular the treads, comprising a rubber composition according to the invention, to achieve reduced hysteresis.

BRIEF DESCRIPTION OF THE DRAWINGS

The characteristics and advantages of the invention will be better understood with reference to the following description, which refers to the drawings illustrating examples of embodiments in a non-limitative manner, in which.

DETAILED DESCRIPTION OF THE INVENTION

The inventors have surprisingly discovered that a copolymer with n blocks (n=2 or 3) intended to constitute an elastomeric matrix of a cross-linkable rubber composition with reduced hysteresis, each of said blocks comprising an "essentially unsaturated" diene elastomer (i.e. having a molar content of units originating from conjugated dienes of greater than 15%), and one or each of said blocks which forms the chain end of said copolymer comprising a polyisoprene, when n=2 or n=3 respectively, which is such that the number-average molecular weight $M_{n1}$ of said or each polyisoprene end block is between about 2,500 and 20,000 g/mol, and such that the number-average molecular weight $M_{n2}$ of the block of said copolymer which is other than said or each polyisoprene end block is between about 80,000 g/mol and 350,000 g/mol, permits significant optimization of the results for hysteresis reduction and processability for said rubber composition.

An "essentially unsaturated" diene elastomer which may be used to obtain said block other than the IR block, which itself complies with this definition, is taken to mean any homopolymer obtained by polymerizing a conjugated diene monomer having from 4 to 12 carbon atoms, or any copolymer obtained by copolymerizing one or more conjugated dienes with themselves or with one or more vinyl aromatic compounds having from 8 to 20 carbon atoms.

Suitable conjugated dienes are, in particular, 1,3-butadiene, 2,3-di(C1 to C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, phenyl-1,3-butadiene, 1,3-pentadiene and 2,4-hexadiene.

Suitable vinyl aromatic compounds are, for example, styrene, ortho-, para- or meta-methylstyrene, the commercial mixture "vinyltoluene", para-tert.-butylstyrene, the methoxystyrenes, vinyl mesitylene.

In particular, taking the hysteresis values relating to "essentially unsaturated" diene elastomers, such as "control" BR or SBR elastomers, as a reference value, such a block copolymer according to the invention is characterized by hysteresis lower than that for corresponding polyisoprene blends, for example of IR and BR or of IR and SBR.

It will be noted that this reduced weight of said or each polyisoprene end block means that it is possible not to bring about an excessively significant reduction in the modulus of the resultant block copolymer.

On the other hand, it will be noted that it is possible according to the invention to obtain non-segregated phases for said or each IR end block and the other block. In other words, it will be noted that phase segregation is not a necessary condition for obtaining the aforementioned advantages of the invention which are achieved by said or each IR end block.

Preferably, the ratio between said molecular weights $M_{n1}/M_{n2}$ is between about 5 and 20%.

Likewise preferably, said block which is other than said or each polyisoprene end block comprises a function capable of interacting with a reinforcing filler.

It will be noted that the reduction in hysteresis is still more marked in this case and that it is accompanied by an improvement in processability, relative to conventional functionalized elastomers.

Said function may be capable of interacting with silica and may, for example, comprise a silanol group or a mono-, di- or trialkoxysilane group.

Said function may also be capable of interacting with carbon black and may, for example, comprise a C—Sn bond.

In this case, this function may be obtained as is known per se by reaction with a functionalizing agent of the organohalotin type which may be of the general formula $R_3SnCl$, or with a coupling agent of the organodihalotin type which may be of the general formula $R_2SnCl_2$, or with a starring agent of the organotrihalotin type which may be of the general formula $RSnCl_3$, or of the tetrahalotin type which may be of the formula $SnCl_4$ (where R is an alkyl, cycloalkyl or aryl radical).

Said function capable of interacting with carbon black may also comprise an amine group.

Preferably, said block which is other than said or each polyisoprene end block may be a polybutadiene, a copolymer of styrene and butadiene, a copolymer of styrene and isoprene or a styrene/butadiene/isoprene terpolymer.

According to another feature of the invention, said or each polyisoprene end block exhibits a content of vinyl 3,4- and 1,2-linkages which is between about 1 and 20%.

Moreover, the content of 1,2-linkages in said block which is other than said or each polyisoprene end block, when it comprises a polybutadiene block, is between about 10% and 60%.

According to another feature of the invention, the contents of 1,2-linkages and styrene linkages in said block which is other than said or each polyisoprene end block, when it comprises a styrene/butadiene copolymer block, are between about 10% and 70% and between about 5% and 50%, respectively.

A cross-linkable rubber composition according to the invention, which is suitable to exhibit improved processability in the uncross-linked state and reduced hysteresis in the cross-linked state, is such that its elastomeric matrix comprises a block copolymer according to the invention as defined above.

According to another feature of the invention, this composition may comprise a reinforcing filler, said block which is other than said or each polyisoprene end block being functionalized, coupled or starred to link with said reinforcing filler.

Said reinforcing filler comprises, for example, a majority proportion of an inorganic reinforcing filler (i.e. a mass fraction which is greater than 50%).

In the present application, "inorganic reinforcing filler" is understood to mean in known manner an inorganic or mineral filler, whatever its color and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tires, in other words which is capable of replacing a conventional tire-grade carbon black filler in its reinforcement function.

Preferably, the entirety or at the very least a majority proportion of the reinforcing white filler is silica ($SiO_2$). The silica used may be any reinforcing silica known to the person skilled in the art, in particular any precipitated or pyrogenic silica having a BET surface area and a specific CTAB surface area both of which are less than 450 m$^2$/g, even if highly dispersible precipitated silicas are preferred.

In the present specification, the BET specific surface area is determined in known manner, in accordance with the method of Brunauer, Emmett and Teller described in "The Journal of the American Chemical Society", vol. 60, page 309, February 1938, and corresponding to Standard AFNOR-NFT-45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. As non-limitative examples of such preferred highly dispersible silicas, mention may be made of the silica Perkasil KS 430 from Akzo, the silica BV3380 from Degussa, the silicas Zeosil 1165 MP and 1115 MP from Rhodia, the silica Hi-Sil 2000 from PPG, the silicas Zeopol 8741 or 8745 from Huber, and treated precipitated silicas such as, for example, the aluminium-"doped" silicas described in application EP-A-735088.

The physical state in which the inorganic reinforcing filler is present is immaterial, whether it be in the form of a powder, microbeads, granules or alternatively balls. Of course, "inorganic reinforcing filler" is also understood to mean mixtures of different inorganic reinforcing fillers, in particular of highly dispersible silicas such as described above.

The reinforcing filler of a rubber composition according to the invention may thus contain in a blend (mixture), in addition to the aforementioned inorganic reinforcing filler or fillers, carbon black as a minority proportion (i.e. in a mass fraction of less than 50%). Suitable carbon blacks are any carbon blacks, in particular the blacks of the type HAF, ISAF and SAF, which are conventionally used in tires, and in particular in tire treads. As non-limitative examples of such blacks, mention may be made of the blacks N115, N134, N234, N339, N347 and N375.

For example, black/silica blends or blacks partially or entirely covered with silica are suitable to form the reinforcing filler.

Also suitable as inorganic reinforcing fillers are carbon blacks modified by silica, such as, although this is not limiting, the fillers sold by CABOT under the name "CRX 2000", which are described in International Patent Specification WO-A-96/37547.

According to another example of embodiment of the composition of the invention, said reinforcing filler comprises a majority proportion of carbon black.

Suitable carbon blacks are all the aforementioned carbon blacks which are commercially available or conventionally used in tires and in particular in treads, as well as black/silica blends, carbon blacks partially or entirely covered in silica, or said carbon blacks modified by silica.

According to a variant embodiment of the invention, said reinforcing filler comprises a blend of 50% inorganic reinforcing filler and 50% carbon black.

It is well-known to the person skilled in the art that it is necessary to use for a inorganic reinforcing filler, such as for example a reinforcing silica or alumina, a coupling agent (inorganic filler/elastomer), also known as a bonding agent, the purpose of which is to create a bond or "coupling" between the inorganic filler and the elastomer, while facilitating dispersion of said inorganic filler within the elastomeric matrix.

A "coupling" agent is more precisely understood to mean an agent capable of establishing a sufficient chemical and/or physical connection between the filler under consideration and the elastomer, while facilitating the dispersion of this filler within the elastomeric matrix; such a coupling agent, which is at least difunctional, has, for example, the simplified general formula "Y—T—X", in which:

Y represents a functional group ("Y" function) which is capable of bonding physically and/or chemically with the inorganic filler, it being possible to establish such a bond, for example, between a silicon atom of the coupling agent and the hydroxyl (OH) surface groups of the inorganic filler (for example, surface silanols in the case of silica);

X represents a functional group ("X" function) which is capable of bonding physically and/or chemically with the elastomer, for example by means of a sulphur atom;

T represents a group making it possible to link Y and X.

The coupling agents must in particular not be confused with simple agents for covering the filler in question which, in known manner, may comprise the Y function which is active with respect to the filler but are devoid of the X function which is active with respect to the elastomer.

Such coupling agents, of variable effectiveness, have been described in a very large number of documents and are well-known to the person skilled in the art. In fact, it is possible to use any known coupling agent which is known to or likely to ensure, in the diene rubber compositions usable for the manufacture of tires, the effective bonding or coupling between the silica and diene elastomer, such as, for example, organosilanes, in particular polysulphurized alkoxysilanes or mercaptosilanes, or polyorganosiloxanes bearing the aforementioned X and Y functions.

Silica/elastomer coupling agents in particular have been described in a large number of documents, the best known being difunctional alkoxysilanes, such as polysulphurized alkoxysilanes.

In particular, polysulphurized alkoxysilanes, which are referred to as "symmetrical" or "asymmetrical" depending on their specific structure, are used, such as those described in U.S. Pat. Nos. 3,842,111; 3,873,489; 3,978,103; 3,997,581; 4,002,594; 4,072,701; 4,129,585; or in the more recent U.S. Patents or U.S. patent application Ser. Nos. 5,580,919; 5,583,245; 5,650,457; 5,663,358; 5,663,395; 5,663,396; 5,674,932; 5,675,014; 5,684,171; 5,684,172; 5,696,197; 5,708,053; 5,892,085, EP-A-1 043 357, which describe such known compounds in detail.

Particularly suitable for implementing the invention, without the definition below being limitative, are symmetrical polysulphurized alkoxysilanes which satisfy the following general formula (I):

$$Z-A-S_n-A-Z, \quad (I)$$

in which:
n is an integer from 2 to 8 (preferably from 2 to 5);
A is a divalent hydrocarbon radical (preferably $C_1-C_{18}$ alkylene groups or $C_6-C_{12}$ arylene groups, more particularly $C_1-C_{10}$ alkylenes, in particular $C_1-C_4$ alkylenes, in particular propylene);
Z corresponds to one of the formulae below:

in which:
the radicals $R^1$, which may or may not be substituted, and may be identical or different, represent a $C_1-C_{18}$ alkyl group, a $C_5-C_{18}$ cycloalkyl group, or a $C_6-C_{18}$ aryl group (preferably $C_1-C_6$ alkyl, cyclohexyl or phenyl groups, in particular $C_1-C_4$ alkyl groups, more particularly methyl and/or ethyl).
the radicals $R^2$, which may or may not be substituted, and may be identical or different, represent a $C_1-C_{18}$ alkoxyl group or $C_5-C_{18}$ cycloalkoxyl group (preferably $C_1-C_8$ alkoxyl groups or $C_5-C_8$ cycloalkoxyl groups, more preferably $C_1-C_4$ alkoxyl groups, more particularly methoxyl and/or ethoxyl).

In the case of a mixture of polysulphurized alkoxysilanes corresponding to the formula (I) above, in particular conventional commercially available mixtures, it will be understood that the mean value of "n" is a fractional number, preferably varying between 2 and 5.

Polysulphurized alkoxysilanes which may more particularly be mentioned are polysulphides (in particular disulphides, trisulphides or tetrasulphides) of bis(alkoxyl ($C_1-C_4$)-alkyl($C_1-C_4$)silylalkyl($C_1-C_4$)), such as for example polysulphides of bis(3-trimethoxysilylpropyl) or of bis(3-triethoxysilylpropyl). Of these compounds, bis(3-triethoxysilylpropyl)tetrasulphide, abbreviated TESPT, of the formula $[(C_2H_5O)_3Si(CH_2)_3S_2]_2$, or bis(triethoxysilylpropyl)disulphide, abbreviated TESPD, of the formula $[(C_2H_5O)_3Si(CH_2)_3S]_2$ are in particular used. TESPD is sold, for example, by Degussa under the names Si266 or Si75 (in the latter case, in the form of a mixture of disulphide (75% by weight) and of polysulphides), or alternatively by Witco under the name Silquest A1589. TESPD is sold, for example, by Degussa under the name Si69 (or X50S when supported at a content of 50 wt. % on carbon black) or alternatively by the company Osi Specialties under the name Silquest A1289 (in both cases, a commercial mixture of polysulphides with an average value of n approaching 4).

The person skilled in the art will be able to adjust the content of coupling agent in the compositions of the invention, according to the intended application, the nature of the elastomer used, and the quantity of reinforcing silicon carbide, supplemented if applicable by any other inorganic filler used as complementary reinforcing filler.

The tire tread compositions according to the invention contain, apart from said elastomeric matrix, said reinforcing filler and optionally one or more inorganic reinforcing filler/elastomer bonding agent(s), all or part of the other constituents and additives usually used in rubber mixtures, such as plasticizers, pigments, antioxidants, antiozone waxes, a cross-linking system based on sulphur and/or on peroxide and/or on bismaleimides, cross-linking accelerators, extender oils, optionally one or more agents for coating the inorganic reinforcing filler, such as alkoxysilanes, polyols, amines etc.

A tire tread according to the invention, which is usable for reducing the rolling resistance of a tire containing it, is such that it comprises a cross-linked rubber composition as defined above.

A tire according to the invention is such that it comprises such a tread.

DESCRIPTION OF ILLUSTRATIVE EMBODIMENTS OF THE INVENTION

The aforementioned features of the present invention, as well as others, will be better understood on reading the following description of several examples of embodiment of the invention, which are given by way of illustration and not of limitation, in comparison with a final example illustrating the prior art.

In the examples, the properties of the compositions of the invention are evaluated as follows:

Mooney viscosity ML(1+4) at 100° C.: measured in accordance with standard ASTM:D-1646, hereinafter abbreviated to ML;

moduli of elongation at 300% (ME 300), at 100% (ME 100) and at 10% (ME 10): measurements taken in accordance with Standard ISO 37, Scott break indices: measured at 20° C.;

breaking load (BL) measured in MPa;

elongation at break (EB) in %;

hysteresis losses (HL): measured by rebound at 60° C. in %, the deformation of the losses measured being 40%;

Shore A hardness: measurements made in accordance with Standard DIN 53505, dynamic shear properties (E' and delta E', G* and delta G*):

measurements as a function of the deformation, performed at 10 Hertz with a peak-to-peak deformation from 0.15% to 50% for E' and from 0.45% to 50% for G*.

The non-linearity expressed is the difference in the shear modulus between 0.15% and 50% deformation, in MPa.

The hysteresis is expressed by the measurement of tan delta at 7% deformation and at 23° C. in accordance with Standard ASTM D2231-71 (reapproved in 1977);

specificity of descriptors for unfilled components:
for example 3 below, in relation to the unfilled materials, the hysteresis descriptor is the value of tan delta which is measured in sinusoidal compression at 10 Hz and at temperatures of 0° C., 20° C. and 50° C.

EXAMPLE 1

Non-functionalized triblock IR/BR/IR copolymer according to the invention and rubber compositions according to the invention comprising this copolymer A.

1) Preparation of Triblock Copolymer A According to the Invention and Two "Control" Homopolymers 1.1) Preparation of Copolymer A According to the Invention 500 g of butadiene together with 0.01 mol of 1,1',4,4'-tetraphenyldilithiobutane, a difunctional initiator known to the person skilled in the art, are added to a 10 liter reactor containing 5,000 g of deaerated toluene. Polymerization is performed at 70° C. and monomer conversion is 100% after 1 hour. This content is determined by weighing an extract dried at 110° C. under reduced pressure of 300 mm Hg.

The molecular weight of the resultant dilithiated polybutadiene, said weight being determined by osmometry on a sample shortstopped with two equivalents of lithium methanolate, is 95,000 g/mol.

Osmometry is performed in these examples by means of an "Osmomat 020" model osmometer sold under the name "Gonotec".

The inherent viscosity of this sample is 1.42 dl/g and the percentage of vinyl structural units, determined by the near infrared method, is 16%.

50 g of isoprene (isoprene purified by distillation, passage through basic alumina then azeotropic entrainment of water by nitrogen bubbling) are added to this dilithiated polybutadiene.

Isoprene conversion after 80 minutes at 40° C. is 100%.

In this manner, a triblock IR/BR/IR copolymer is obtained, which is subjected to antioxidant treatment by adding 0.4 parts per hundred parts of elastomer (phr) of 4,4'-methylene-bis-2,6-tert.-butylphenol. The copolymer is recocered by a conventional steam stripping operation and is then dried on a roll tool at 100° C. for 20 minutes.

The inherent viscosity of this copolymer A is 1.50 dl/g and the percentage of vinyl structural units in the isoprene moiety, determined by the proton NMR method, is 8%.

On the basis of this molecular weight, determined by osmometry, and this NMR analysis, it may be concluded that the molecular weight of each IR block is 10,000 g/mol, a conclusion which concurs with the injected quantities of isoprene and active initiator.

1.2) Preparation of a Control Homopolymer B Comprising Polybutadiene

Control homopolymer comprising polybutadiene is prepared under conditions identical to those described for the preparation of the polybutadiene in section 1.1, except that the initiator used for this polybutadiene B is not dilithiated.

This initiator is n-butyllithium (hereinafter n-BuLi) and it is introduced into the reaction medium in an amount of 0.01 mol. The polybutadiene obtained from the polymerization reaction is subjected to antioxidant treatment by adding 0.4 phr of 4,4'-methylene-bis-2,6-tert.-butylphenol.

The molecular weight of the resultant polybutadiene B, said weight being determined by osmometry, is 120,000 g/mol.

The inherent viscosity of this polybutadiene B is 1.38 dl/g and the percentage of vinyl structural units in the isoprene moiety, determined by the near infrared method, is 16%.

1.3) Preparation of a Control Homopolymer C Consisting of Polyisoprene

Control homopolymer C comprising polyisoprene is prepared under conditions identical to those described in section 1.2 for the synthesis of the polybutadiene B, with butadiene being replaced with isoprene.

The polyisoprene obtained from the polymerization reaction is subjected to antioxidant treatment by adding 4,4'-methylene-bis-2,6-tert.-butylphenol.

This polyisoprene is recovered by a conventional steam stripping operation and is then dried on a roll tool at 100° C. for 20 minutes.

The molecular weight of the resultant polyisoprene C, said weight being determined by osmometry, is 110,000 g/mol.

The inherent viscosity of this polyisoprene C is 1.29 dl/g and the percentage of 3,4-linkages in the isoprene moiety is 8%.

2) Rubber Compositions According to the Invention each Comprising Copolymer A, in Comparison with "Control" Compositions Based on said Control Homopolymers B and C:

2.1) Rubber Compositions Devoid of Reinforcing Filler

Testing was performed on:

a composition A according to the invention based on the block copolymer A according to the invention, a "control" composition B based on said polybutadiene B, and a "control" composition C based on a blend of said polybutadiene B and said polyisoprene C, the polyisoprene content in the blend being equivalent to the polyisoprene content in said copolymer A.

The following formulation in parts per 100 by weight of elastomer (phr) was used for each of these three compositions A, B and C:

| | |
|---|---|
| elastomeric matrix | 100 |
| ZnO | 2.5 |
| stearic acid | 1.5 |
| sulphur | 1.2 |
| sulphenamide (1) | 1.2 | where (1) represents N-cyclohexyl-2-benzothiazylsulphenamide.

Each composition is prepared in an internal mixer by thermomechanical working in a stage lasting 5 minutes, at a paddle speed of 40 rpm, until an identical dropping temperature of 90° C. is reached, while the vulcanizing system is incorporated on the "homo-finisher" at 30° C. Vulcanization is carried out at 150° C. for 75 minutes.

The results are set out in FIG. 1 and Table 1 below:

TABLE 1

| Compositions | Composition A | Composition B | Composition C |
|---|---|---|---|
| tan delta: | | | |
| at 0° C. | 0.0562 | 0.075 | 0.0768 |
| at 20° C. | 0.0517 | 0.067 | 0.0718 |
| at 50° C. | 0.0409 | 0.0584 | 0.0604 |

It may be concluded from these results that, within the range of relevance to the measurement of tire rolling resistance, i.e. for tan delta temperatures ranging from 0° C. to 50° C., the level of dissipation obtained with the composition A according to the invention, based on the IR/IBR/IR triblock copolymer A, is always below that obtained with compositions B or C, respectively based on polybutadiene B and on the blend of polybutadiene B and polyisoprene C.

Figure 1:
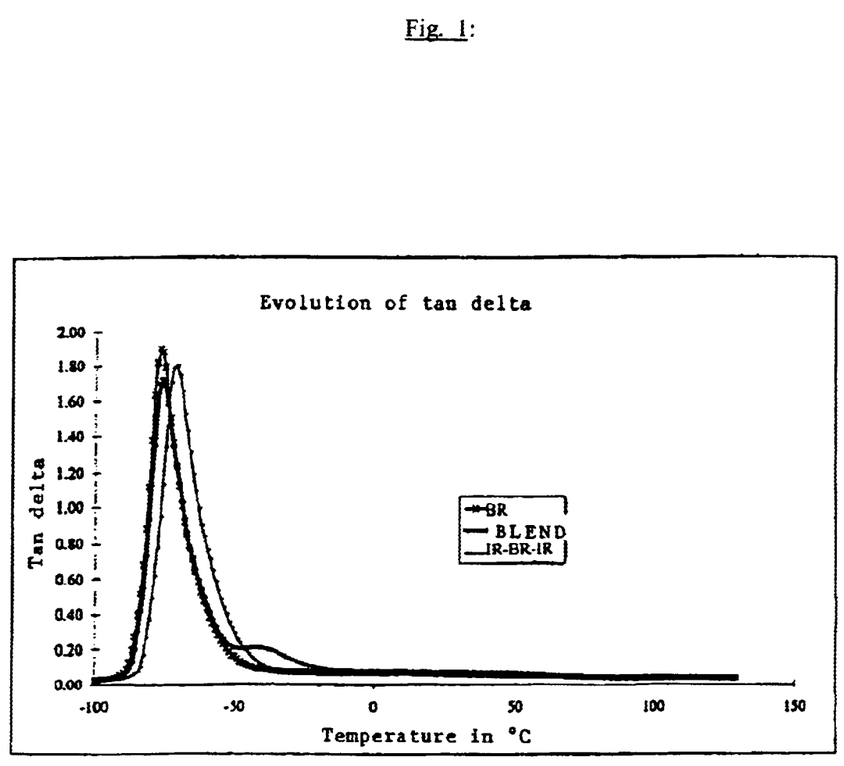
FIG. 1 is a graph of the evolution of tan delta for three copolymers of the present invention.

As is evident from FIG. 1, it will be noted that the copolymer A of said composition A exhibits non-segregated phases for the three blocks it comprises, whereas the blend of the homopolymers B and C gives rise to segregated phases (it may be concluded from the presence of a second group of peaks on the dissipation graph relating to the blend that the phases are segregated).

2.2) Rubber Compositions for Tire Treads Comprising a Reinforcing Filler

Testing was performed in this case on three compositions A', B' and C' which differ from said compositions A, B and C of section 2.1 in that they each contain a reinforcing filler consisting of carbon black N375. More precisely, each composition A', B', C' which was tested comprises a quantity of reinforcing filler which is either equal to 40 phr (the corresponding compositions are hereinafter identified by the references $A'_1$, $B'_1$ and $C'_1$), or equal to 60 phr (the corresponding compositions are hereinafter identified by the references $A'_2$, $B'_2$ and $C'_2$).

The following formulation (in phr) was accordingly used for each of these three compositions A', B' and C':

| | |
|---|---|
| elastomeric matrix | 100 |
| N375 | 40 or 60 |
| ZnO | 2.5 |
| stearic acid | 1.5 |
| sulphur | 1.2 |
| sulphenamide (1) | 1.2 | where (1) represents N-cyclohexyl-2-benzothiazylsulphenamide.

Each composition is prepared in an internal mixer by thermomechanical working in a stage lasting 5 minutes, at a paddle speed of 40 rpm, until an identical dropping temperature of 160° C. is reached, while the vulcanizing system is incorporated on the "homo-finisher" at 30° C. Vulcanization is carried out at 150° C. for 30 minutes.

The results are set out in Table 2 below.

TABLE 2

| Compositions | $A'_1$ | $B'_1$ | $C'_1$ | $A'_2$ | $B'_2$ | $C'_2$ |
|---|---|---|---|---|---|---|
| E' at 0.2% (MPa) | 11.56 | 11.77 | 11.71 | 18.51 | 17.67 | 17.6 |
| E' at 7% (MPa) | 6.83 | 6.44 | 6.3 | 10.14 | 9.65 | 8.99 |
| delta E' (MPa) | 4.73 | 5.33 | 5.41 | 8.37 | 8.02 | 8.61 |
| max. tan delta | 0.177 | 0.214 | 0.209 | 0.22 | 0.255 | 0.258 |
| tan delta | Dynamic properties as a function of temperature | | | | | |
| at 0° C. | 0.156 | 0.173 | 0.182 | 0.169 | 0.179 | 0.182 |
| at 20° C. | 0.153 | 0.170 | 0.175 | 0.172 | 0.186 | 0.188 |
| at 50° C. | 0.144 | 0.163 | 0.165 | 0.169 | 0.185 | 0.188 |

With regard to properties in the vulcanized state, it will be noted for these carbon black filled compositions, irrespective of the filler content, that the hysteresis properties at low deformation of compositions $A'_1$ and $A'_2$ according to the invention based on the triblock IR/BR/IR copolymer A are greatly improved relative to those of the other compositions based on polybutadiene B or on the blend of polybutadiene B and polyisoprene C.

It may thus be concluded that the rolling resistance of tires having a tread comprising said compositions $A'_1$ and $A'_2$ according to the invention is improved relative to that of tires having a tread in each case comprising these "control" compositions.

EXAMPLE 2

Functionalized diblock SBR/IR copolymers according to the invention and rubber compositions according to the invention comprising these copolymers.

1) Preparation of a Functionalized Diblock SBR/IR Copolymer D According to the Invention and a Functionalized SBR "Control" Copolymer E, these Copolymers Exhibiting an ML of 90

1.1) Preparation of the Block Copolymer D According to the Invention 1.1.1) Preparation of a Living Polyisoprene The polyisoprene is prepared continuously in a 14 liter capacity reactor equipped with a turbine type agitator. The following components are continuously introduced into this reactor, on the one hand cyclohexane and isoprene in ratios by weight of 100:14.5 respectively and on the other a solution of 10,000 μmol of active sec.-butyllithium (s-BuLi) per 100 g of isoprene.

The flow rates of the various solutions are adjusted such that the average dwell time is 40 minutes. The reactor temperature is maintained at 60° C. Monomer conversion is 100% at the reactor outlet.

The residual butyllithium content is determined from a sample by means of an addition product which is obtained with benzophenone and is assayed by gas phase chromatography using an "HP 5800" chromatograph on a "CPSil 19" column (with a retention time of 8 minutes, 20 seconds). The residual BuLi content is estimated at 5% in this manner.

The number-average molecular weight of the resultant living polyisoprene, said weight being determined by osmotic pressure measurement on a sample shortstopped with one equivalent of lithium methanolate, is 9,800 g/mol. This osmotic pressure measurement is performed by means of an "Osmomat 090" model osmometer sold under the name "Gonotec".

The glass transition temperature Tg of this polyisoprene is −64° C. and the content of 3,4-linkages is 8%.

The lithiated polyisoprene is stored under nitrogen at a temperature of 10° C. No change in content is observed over several weeks' storage under nitrogen pressure at this temperature.

2.1.1) Copolymerization of Butadiene and Styrene Initiated by this Living Polyisoprene Cyclohexane, butadiene and styrene are introduced into the aforementioned 14 liter reactor at respective mass flow rates of 100:12.2:2.3. 80 parts per million (by weight) of tetramethylethylenediamine are also added to this reactor.

200 μmol of n-BuLi are injected at the line inlet in order to neutralize protic impurities introduced by the various constituents present in the line inlet.

610 μmol per 100 g of monomers of the living polyisoprene solution described in section 1.1.1) are injected into the reactor inlet.

The various flow rates are adjusted such that the average dwell time in the reactor is 40 minutes. The temperature is maintained at 90° C.

The conversion rate, which is measured on a sample taken at the reactor outlet, is 90%, while inherent viscosity, which is measured at 0.1 g/dl in toluene, is 2.01 dl/g.

300 μmol/100 g of monomers of a functionalizing agent consisting of dibutyldichlorotin are then added to a dynamic mixer equipped with an agitator set to a speed of 2,500 rpm and containing the SBR/IR block copolymer which has been obtained.

After 4 minutes of this coupling reaction, the copolymer functionalized in this manner is subjected to antioxidant treatment with 0.8 phr of 2,2'-methylene-bis(4-methyl-6-tert.-butylphenol) and 0.2 phr of N-(1,3-dimethylbutyl)-N'-phenyl-p-phenylenediamine.

The copolymer treated in this manner is separated from its solution by a steam stripping operation and is then dried on a roll tool at 100° C. for 20 minutes in order to obtain the functionalized SBR/IR block copolymer D according to the invention.

The inherent viscosity of this copolymer D is 2.49 dl/g and its ML viscosity is 88.

The SBR block of this copolymer D contains 16% styrene (by weight) and the content of vinyl structural groups in its butadiene moiety is 24%.

1.2) Preparation of "Control" Copolymer E

This functionalized SBR E is prepared by copolymerizing styrene and butadiene in a reaction initiated with n-BuLi by performing the method described in the preceding section 1.1.2), except that the 610 μmol/100 g of monomers of living polyisoprene are replaced by 630 μmol/100 g of monomers of active n-BuLi, in order to initiate this copolymerization.

Conversion at the reactor outlet is 98% and the inherent viscosity of the resultant SBR, before addition of dibutyldichlorotin, is 1.82 dl/g.

After coupling with dibutyldichlorotin, the SBR is subjected to the aforementioned antioxidant treatment and to the stated stripping and drying operations.

The inherent viscosity of the resultant copolymer E is 2.34 dl/g and its ML viscosity is 90.

The microstructure of this copolymer E is identical to that stated above for the SBR block of said copolymer D.

2) Preparation of a Functionalized Diblock SBR/IR Copolymer F According to the Invention and a Functionalized "Control" SBR Copolymer G, these Copolymers Exhibiting an ML of 70

2.1) Preparation of the Block Copolymer F According to the Invention

This functionalized copolymer F is prepared by performing the method described in section 1.1.2 for said copolymer D, except that:

the quantity of living polyisoprene added to initiate the copolymerization is 700 μmol/100 of monomers in this case, instead of the 610 μmol stated in said section 1.1.2, and that the quantity of dibutyldichlorotin added is 350 μmol/100 g of monomers.

Conversion at the reactor outlet is 99% and the inherent viscosity of the resultant SBR/IR block copolymer, before addition of dibutyldichlorotin, is 1.74 dl/g.

After coupling with dibutyldichlorotin, the resultant copolymer is subjected to the aforementioned antioxidant treatment and to the stated stripping and drying operations.

The inherent viscosity of the resultant copolymer F is 2.16 dl/g and its ML viscosity is 70.

The microstructure of this copolymer F is identical to that stated above for the SBR block of said copolymer D.

2.2) Preparation of "Control" SBR Copolymer G

This functionalized SBR G is prepared by copolymerizing styrene and butadiene in a reaction initiated with n-BuLi by performing the method described in section 1.1.2, except that the 610 μmol/100 g of monomers of living polyisoprene are replaced by 720 μmol/100 g of monomers of active n-BuLi to initiate this copolymerization.

Conversion at the reactor outlet is 97% and the inherent viscosity of the resultant SBR, before addition of dibutyldichlorotin, is 1.71 dl/g.

After coupling with dibutyldichlorotin, the SBR is subjected to the aforementioned antioxidant treatment and to the stated stripping and drying operations.

The inherent viscosity of the resultant copolymer G is 2.12 dl/g and its ML viscosity is 70.

The microstructure of this copolymer G is identical to that stated above for the SBR block of said copolymer D.

3) Rubber Compositions According to the Invention for Tire Treads each Comprising a Functionalized Diblock SBR/IR Copolymer According to the Invention in Comparison with "Control" Compositions 3.1) Compositions with a Reinforcing Filler Based on Carbon Black 3.1.1) First Series of Compositions Testing was performed on two rubber compositions, each comprising 50 phr of carbon black N220:

a composition $D_1$ according to the invention based on said functionalized copolymer D according to the invention with SBR/IR blocks and an ML of 90, and a "control" composition $E_1$ based on said "control" SBR copolymer E, also functionalized and with an ML of 90.

The formulation of each composition $D_1$, $E_1$ is as follows (phr):

| | |
|---|---|
| elastomer | 100 |
| N220 | 50 |
| ZnO | 3 |
| stearic acid | 2.5 |
| antioxidant (1) | 1.5 |
| sulphur | 1.5 |
| sulphenamide (2) | 0.8 | where (1) is N-1,3-dimethylbutyl-N'-phenyl-p-phenylenediamine, and (2) is N-cyclohexyl-2-benzothiazylsulphenamide.

Each composition $D_1$, $E_1$ is prepared in an internal mixer by thermomechanical working in a stage lasting 5 minutes, at a paddle speed of 40 rpm, until an identical dropping temperature of 170° C. is reached, while the vulcanizing system is incorporated on a roll tool at 30° C.

Vulcanization is carried out at 150° C. for 40 minutes.

The results are set out in Table 3 below:

TABLE 3

| Composition | Composition $D_1$ | Composition $E_1$ |
|---|---|---|
| ML, rubber | 88 | 90 |
| Properties in the non-vulcanized state: | | |
| ML | 123 | 135 |
| Properties in the vulcanized state: | | |
| ME 10% | 5.35 | 5.35 |
| ME 100% | 1.80 | 1.75 |
| ME 300% | 2.15 | 2.05 |
| Shore | 63 | 62 |
| Scott break (MPa) | 23.01 | 21.41 |
| Elongation at break (%) | 536 | 538 |
| Losses, 60° C. (30% deformation) | 27.6 | 29.8 |
| Dynamic properties as a function of deformation: | | |
| G* at 0.45% | 3.7 | 3.8 |
| G* at 50% | 1.85 | 1.9 |
| max. tan delta | 0.154 | 0.16 |

With regard to the properties in the vulcanized state of these carbon black filled compositions, it may be concluded that the hysteresis properties (at low and high levels of deformation) of the composition $D_1$ according to the invention based on said functionalized SBR/IR block copolymer D are improved relative to those of the "control" composition $E_1$ based on the functionalized SBR E.

It may thus be concluded that the rolling resistance of a tire having a tread comprising said composition $D_1$ according to the invention is improved relative to that of a tire having a tread comprising said "control" composition $E_1$.

Furthermore, it will be noted that this composition $D_1$ according to the invention exhibits a viscosity ML lower than that of said composition $E_1$, which amounts to better processability relative to this conventional composition $E_1$.

It may thus be concluded that, when incorporated into a rubber composition filled with carbon black, said copolymer D according to the invention imparts hysteresis and processing properties which are improved relative to such a known composition $E_1$.

3.1.2) Second Series of Compositions

Testing was performed on three rubber compositions, each comprising 50 phr of carbon black N375:

- a composition $D_2$ according to the invention based on said functionalized copolymer D according to the invention with SBR/IR blocks and an ML of 90,
- a "control" composition $E_2$ based on said "control" SBR copolymer E, also functionalized and with an ML of 90 and
- a "control" composition $E'_2$ based on a blend of said "control" SBR copolymer E and said "control" polyisoprene C of example 1.

The formulation of each composition $D_2$, $E_2$, $E'_2$ is as follows (phr):

| | |
|---|---|
| elastomer | 100 |
| N375 | 50 |
| ZnO | 2.5 |
| stearic acid | 1.5 |
| antioxidant (1) | 1.5 |
| sulphur | 1.2 |
| sulphenamide (2) | 1.2 | where (1) is N-1,3-dimethylbutyl-N'-phenyl-p-phenylenediamine, and (2) is N-cyclohexyl-2-benzothiazylsulphenamide.

Each composition $D_2$, $E_2$, $E'_2$ is prepared in an internal mixer by thermomechanical working in a stage lasting 5 minutes, at a paddle speed of 40 rpm, until an identical dropping temperature of 160° C. is reached, while the vulcanizing system is incorporated on a "homo-finisher" at 30° C.

Vulcanization is carried out at 150° C. for 30 minutes.
The results are set out in Table 4 below:

TABLE 4

| Composition | Composition $D_2$ | Composition $E_2$ | Composition $E'_2$ |
|---|---|---|---|
| ML, rubber | 88 | 90 | |
| Properties in the non-vulcanized state: | | | |
| ML | 77 | 87 | 74 |
| Properties in the vulcanized state: | | | |
| ME 10% | 5.59 | 6.03 | 5.7 |
| ME 100% | 2.1 | 2.26 | 2.15 |
| ME 300% | 2.79 | 2.86 | 2.86 |
| ME 300%/ME 100% | 1.33 | 1.27 | 1.33 |
| Shore | 66.1 | 67.2 | 66.1 |
| Scott break (MPa) | 20.9 | 20 | 21.2 |
| Elongation at break (%) | 449 | 446 | 467 |
| Losses, 60° C. (30% deformation) | 24.6 | 28.8 | 27.2 |

TABLE 4-continued

| Composition | Composition $D_2$ | Composition $E_2$ | Composition $E'_2$ |
|---|---|---|---|
| Dynamic properties as a function of deformation: | | | |
| G* at 0.45% | 4.25 | 5.1 | 4.71 |
| G* at 50% | 2.3 | 2.53 | 2.34 |
| delta G* | 1.95 | 2.57 | 2.37 |
| max. tan delta | 0.174 | 0.193 | 0.192 |

With regard to the properties in the vulcanized state of these carbon black filled compositions, it may be concluded that the hysteresis properties (at low and high levels of deformation) of the composition $D_2$ according to the invention based on said functionalized SBR/IR block copolymer D are improved relative to those of the "control" composition $E_2$ based on the functionalized SBR E and to those of the "control" composition $E'_2$ based on the aforementioned blend.

It may thus be concluded that the rolling resistance of a tire having a tread comprising said composition $D_2$ according to the invention is improved relative to that of tires having a tread in each case comprising said "control" compositions $E_2$ and $E'_2$.

Furthermore, it will be noted that this composition $D_2$ according to the invention exhibits a viscosity ML which, on the one hand, is lower than that of said composition $E_2$, which amounts to better processability relative to this conventional composition $E_2$ and which is, on the other, close to that of said composition E'2, which amounts to processability comparable with that of this latter composition.

It may thus be concluded that, when incorporated into a rubber composition filled with carbon black, said copolymer $D_2$ according to the invention imparts hysteresis and processing properties which are improved overall relative to such known compositions $E_2$ and $E'_2$.

3.2) Compositions with a Reinforcing Filler Based on Silica

Testing was performed on two rubber compositions, each comprising 50 phr of silica.

- a composition F according to the invention based on said functionalized copolymer F according to the invention with SBR/IR blocks and an ML of 70, and
- a "control" composition G based on said "control" SBR copolymer G, also functionalized and with an ML of 70.

The formulation of each composition F, G is as follows (phr):

| | |
|---|---|
| elastomer | 100 |
| silica (1) | 50 |
| bonding agent (2) | 10 |
| ZnO | 3 |
| stearic acid | 2.5 |
| antioxidant (3) | 2.5 |
| sulphur | 1.5 |
| sulphenamide (4) | 1.8 | where (1) is a highly dispersible silica in the form of microbeads sold by Rhodia under the name "Zeosil 1165 MP", (2) is a polysulphurised organosilane sold by Degussa under the name "X50S", (3) is N-(3,1-dimethylbutyl)-N'-phenyl-p-phenylenediamine, and (4) is N-cyclohexyl-2-benzothiazylsulphenamide.

Each composition F, G is prepared in accordance with the method described in European Patent Specification EP-A-501 227, it being stated that thermomechanical working is carried out in two stages which last for 5 minutes and 4 minutes respectively, at an average paddle speed of 45 rpm, until an identical maximum dropping temperature of 160° C. is reached, while the vulcanizing system is incorporated on a roll tool at 30° C.

Vulcanization is carried out at 150° C. for 40 minutes.

The results are set out in Table 5 below:

TABLE 5

| Composition | Composition F | Composition G |
|---|---|---|
| ML, rubber | 70 | 70 |
| Properties in the non-vulcanized state: | | |
| ML | 100 | 102 |
| Properties in the vulcanized state: | | |
| ME 10% | 8.2 | 8.4 |
| ME 100% | 2.64 | 2.64 |
| ME 300% | 2.88 | 2.90 |
| Shore | 72.5 | 72.5 |
| Scott break (MPa) | 20.2 | 21.0 |
| Elongation at break (%) | 442 | 458 |
| Losses, 60° C. (30% deformation) | 25.35 | 27.5 |
| Dynamic properties as a function of deformation: | | |
| G* at 0.45% | 6.79 | 7.03 |
| G* at 50% | 2.54 | 2.57 |
| max. tan delta | 0.135 | 0.151 |

With regard to the properties in the vulcanized state of these silica filled compositions, it may be concluded, on the one hand, that the hysteresis properties (at low and high levels of deformation) of the composition F according to the invention based on said functionalized SBR/IR block copolymer F are improved relative to those of the "control" composition G based on said, likewise functionalized, SBR G and that, moreover, the processability of this composition F according to the invention is substantially equivalent to that of said composition G (approximately identical ML values).

It may thus be concluded that the rolling resistance of a tire having a tread comprising said composition F according to the invention is improved relative to that of a tire having a tread comprising said "control" composition G.

What is claimed is:

1. A cross-linkable or cross linked rubber composition comprising an elastomeric matrix, said composition exhibiting a reduced hysteresis in the cross-linked state and being usable in a tire tread, wherein said elastomeric matrix comprises a block copolymer having n blocks, each of said blocks comprising an essentially unsaturated diene elastomer having a molar content of units originating from conjugated dienes of greater than 15%, and one or each of said blocks which forms the chain end of said copolymer consisting of a polyisoprene, wherein n=2 or 3, wherein the number-average molecular weight $M_{n1}$ of said or each polyisoprene end block is between about 2,500 and 20,000 g/mol, wherein the number-average molecular weight $M_{n2}$ of the block of said copolymer which is other than said or each polyisoprene end block is between about 80,000 and 350,000 g/mol.

2. The rubber composition according to claim 1, wherein the ratio of said molecular weights $M_{n1}/M_{n2}$ is between about 5 and 20%.

3. The rubber composition according to claim 1, wherein n=2.

4. The rubber composition according to claim 1, wherein n=3.

5. The rubber composition according to claim 1, further comprising a reinforcing filler.

6. The rubber composition according to claim 5, wherein said reinforcing filler comprises an inorganic reinforcing filler.

7. The rubber composition according to claim 6, wherein said inorganic reinforcing filler is silica.

8. The rubber composition according to claim 6, wherein said block which is other than said or each polyisoprene end block is functionalized, coupled or starred for bonding with said inorganic reinforcing filler.

9. The rubber composition according to claim 8, wherein said block which is other than said or each polyisoprene end block comprises a silanol functional group.

10. The rubber composition according to claim 8, wherein said block which is other than said or each polyisoprene end block comprises a mono-, di- or trialkoxysilane functional group.

11. The rubber composition according to claim 5, wherein said reinforcing filler comprises carbon black.

12. The rubber composition according to claim 11, wherein said block which is other than said or each polyisoprene end block is functionalized, coupled or starred for bonding with said carbon black.

13. The rubber composition according to claim 12, wherein said block which is other than said or each polyisoprene end block comprises a functional group with a C—Sn bond.

14. The rubber composition according to claim 12, wherein this functional group is obtained by reaction with a mono-, di-, tri- or tetrahalotin agent.

15. The rubber composition according to claim 12, wherein said block which is other than said or each polyisoprene end block comprises an amine functional group.

16. The rubber composition according to claim 1, wherein said block which is other than said or each polyisoprene end block is a polybutadiene.

17. The rubber composition according to claim 1, wherein said block which is other than said or each polyisoprene end block is a copolymer of styrene and butadiene.

18. The rubber composition according to claim 1, wherein said block which is other than said or each polyisoprene end block is a copolymer of styrene and isoprene.

19. The rubber composition according to claim 1, wherein said or each polyisoprene end block has a content of 3,4- and 1,2-vinyl linkages which is substantially between about 1 and 20%.

20. The rubber composition according to claim 16, wherein the polybutadiene block comprises 1,2-linkage content which is between about 10% and 60%.

21. The rubber composition according to claim 17, said copolymer block comprises 1,2-linkages content between about 10% and 70% and styrene linkages content between about 5% and 50%, respectively.

22. A tire tread usable for reducing the rolling resistance of a tire comprising said tire tread, wherein said tire tread comprises a cross-linked rubber composition according to claim 1.

23. A tire comprising a tread according to claim 22.

* * * * *